P. C. HEWITT.
METHOD OF AND APPARATUS FOR TRANSLATING ELECTRICAL VARIATIONS.
APPLICATION FILED MAY 15, 1915. RENEWED AUG. 25, 1916.
1,225,332.
Patented May 8, 1917.
3 SHEETS—SHEET 2.
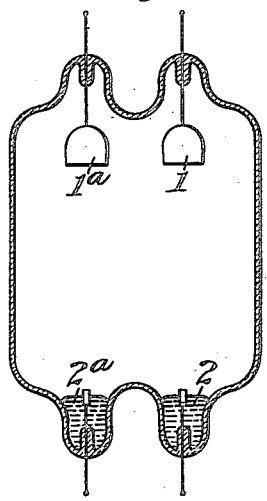
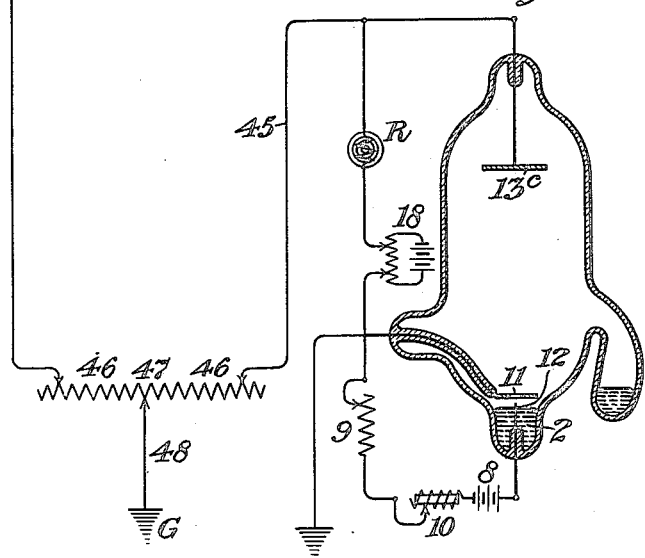
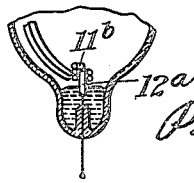
WITNESSES
INVENTOR
Peter Cooper Hewitt
BY
ATTORNEY

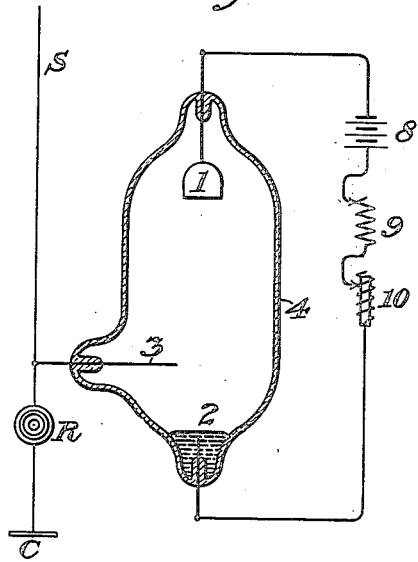
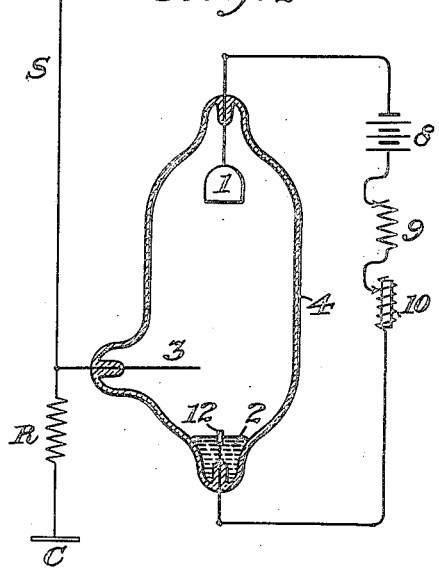
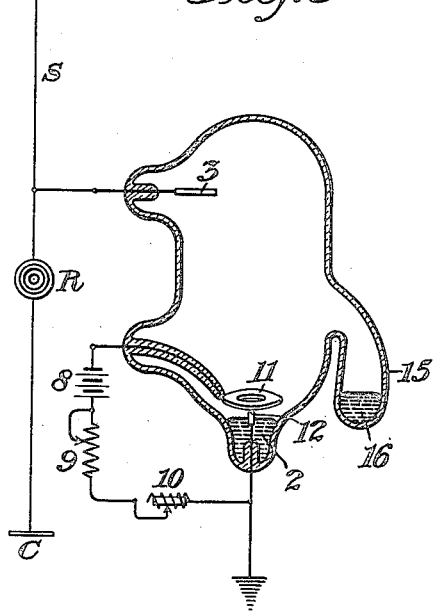
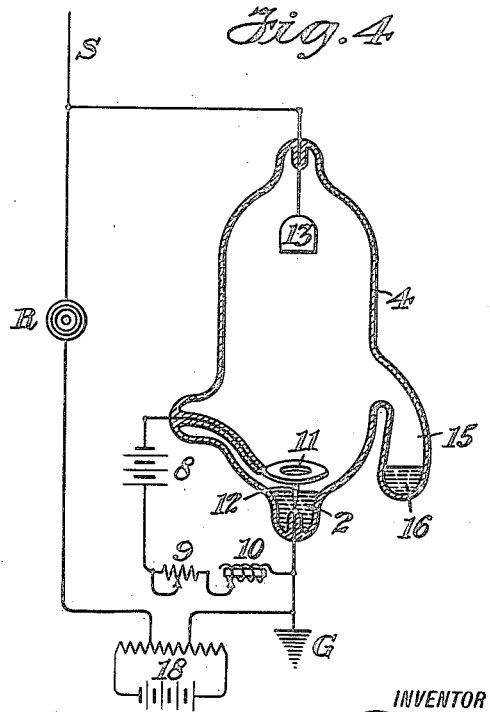

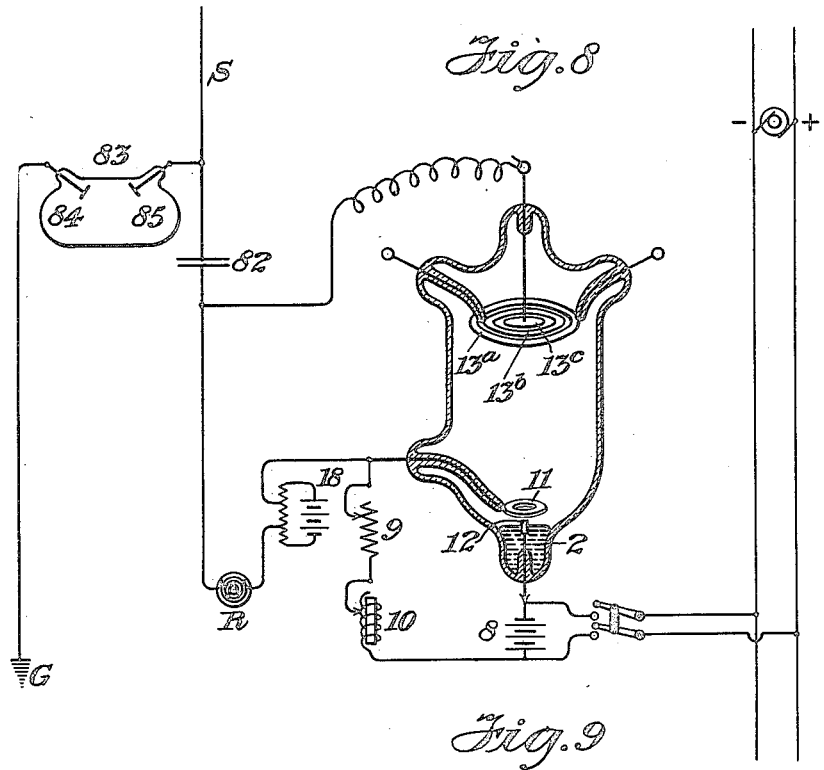
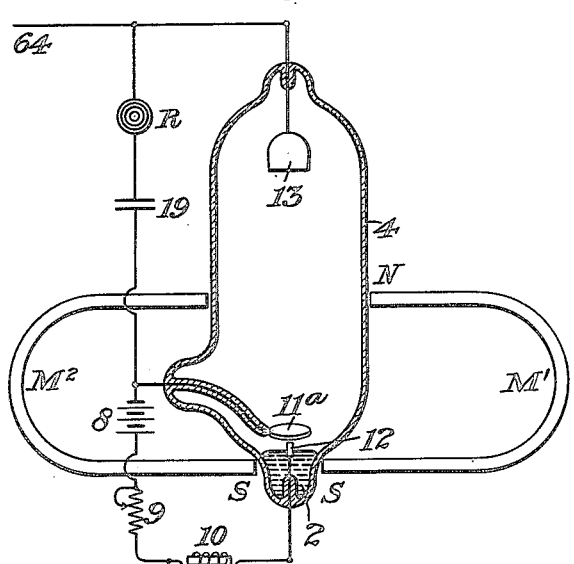

UNITED STATES PATENT OFFICE.

PETER COOPER HEWITT, OF RINGWOOD MANOR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

METHOD OF AND APPARATUS FOR TRANSLATING ELECTRICAL VARIATIONS.

1,225,332. Specification of Letters Patent. Patented May 8, 1917.

Original application filed March 30, 1907, Serial No. 365,597. Divided and this application filed May 15, 1915, Serial No. 28,433. Renewed August 25, 1916. Serial No. 116,805.

*To all whom it may concern:*

Be it known that I, PETER COOPER HEWITT, a citizen of the United States, and resident of Ringwood Manor, in the county of Passaic and State of New Jersey, have invented certain new and useful Improvements in Methods of and Apparatus for Translating Electrical Variations, of which the following is a specification.

My present invention involves the discovery of certain phenomena developed by the flow of electric current through a gas or vapor, and it particularly concerns the utilization of such phenomena in connection with electrical variations of all kinds and for various purposes.

It is useful in connection with very rapid and very feeble electrical variations, and is particularly adapted to translate variations of potential. When used for detecting the oscillations in the receiving circuit of a space telegraph or telephone system, the results demonstrate extreme sensitiveness, reliability and durability.

My invention contemplates the employment of one or more special or auxiliary terminals, or electrodes, in operative relation to a gas or vapor carrying current, said current being supplied to the gas independently of such auxiliary terminal or terminals.

The geometrical characteristics of the conducting vapor may be determined by the size, shape, etc., of a containing vessel and by the size and position of electrodes therein. The electrical characteristics of the gas or vapor are dependent upon the geometrical characteristics, upon the kind and purity of the gas or vapor, upon the nature and material of the electrodes, and upon the density of the vapor. The density of the vapor depends upon the temperature and pressure, and the initial density of a given vapor in an hermetically sealed container, may be varied through changes of internal temperature. Normal or initial internal temperature is dependent upon the temperature of the surroundings. Changes of temperature during operation are dependent upon the ratio of heat generation to heat radiation. The internal heat generation is dependent upon the above mentioned electrical characteristics and upon the amount of current flowing in the vapor device. The heat radiation is dependent upon the heat radiating area and the temperature of the surroundings. Hence, in the operation of a vapor device having given geometrical and electrical characteristics of construction, the density of the vapor is controllable by regulating current flow, heat radiating area, and temperature of the surroundings.

The reactions attending passage of current in a conducting gas or vapor may be subdivided into three definite classes; (1) reactions at and near the positive electrode or anode; (2) reactions in the gas or vapor itself; and (3) reactions at and adjacent the negative electrode, or cathode, including reactions at the junction of the negative dark space with the vapor carrying current from the main positive electrode.

The separate phenomena of which the reactions at the positive electrode or anode are made up, are numerous, and are chiefly modified by the position, size, and physical state of the anode; and by the purity, density, and kind of gas; and also by current density in the gas. Certain of them are sensitive to magnetic action. One of the visible reactions of the positive electrode or anode, is a luminous ball or bush which is very sensitive to magnetic action and which tends to be a source of variation. At low densities it is very sensitive to magnetic action.

The reactions in the conducting vapor itself and modifications thereof, independent of the reactions near the electrodes, have been broadly stated by me. They may be modified by a magnet, especially at low densities. The reactions of the vapor column are normally stable, and for purposes of this invention, its length, the kind of gas, the gas density, and the current density are chief modifying factors to be considered and controlled.

The phenomena at the negative electrode are numerous, and include two distinct classes; one class being those found at the negative electrode when it is in its primary condition, before it has been changed to what has been termed by me its "low resistance" or "broken down" state, and another class being those which exist after the negative electrode has attained the low resistance state. It is characteristic of the first mentioned class that on subjecting the negative electrode in the primary condition, to sufficient electrical stress, a certain point is reached where a leakage current may be observed under certain conditions. A modified leakage current flowing under low stress is manifest when said electrode is present in a current carrying vapor having sufficient current density. The opposition or apparent resistance to this leakage current, is modified by the surface area of the electrode, and by the current density in the vapor adjacent thereto, and it varies in ways peculiar to itself with the nature, purity and the density of the vapor, and with the nature and condition of the electrode. It varies with the temperature of the negative electrode, and if this temperature be increased to incandescence, this resistance then reaches or comes near its minimum limit. After the last state of resistance in the primary condition has been reached, if the temperature of the electrode be increased to such a point as to bring about a physical or chemical change of state of the electrode, while current, with sufficient backing, is passing into said electrode, the reactions will change to those of the second class; namely, those attendant upon the broken down state of resistance, and the reactions of the negative electrode will then be measured by a less drop in potential. It is often desirable that the drop over the device should be as small as possible and in such case this latter state should serve best. This broken down state of the negative electrode may be attained by various expedients now well known in the art.

Accompanying this change are the visible phenomena of the negative flame to which I have before called attention. The visible phenomena consist of a bright spot on the negative electrode with a flame apparently hovering over this spot. The peculiar characteristic of this flame is that it tends to lie in and along the magnetic lines of force, rather than to be twisted or distorted by them, as is usual to current passing. It tends normally to project itself perpendicularly from the surface of the electrode. A magnet may be used to modify or adjust the conditions at the negative electrode. The bright spot tends to locate itself at a meniscus of an irregularity on an electrode.

The flame itself is surrounded by a dark space and when the flame is in normal position in a right line with the vapor column, the top of the flame usually marks the boundary of the dark space where it joins the luminous positive column of conducting vapor coming from the positive electrode. The flame is very sensitive to electrical variations, and such variations may be observed when looking at it. Its reactions may also be varied by a magnetic field and its reactions may be made usable in this way. When the positive electrode is arranged at comparatively short distance from the negative electrode, as for instance, when located within the dark space, there may be no luminous positive column, and the reactions at the positive are modified at certain distances from the cathode and may be rendered practically unnoticeable. The positive bush reaction may be practically eliminated by these means. The length of the vapor column is decreased so that the total voltage drop across the device is decreased, and the drop due to the positive bush may be seriously modified if not altogether eliminated. Many of the above described reactions are modified by rapid electrical variations and are useful in connection with them.

In the practice of my invention I expose within the vapor device, supplied with current through main electrodes, a separate terminal or two or more terminals operatively associated with a telephone or other indicating instrument and with a source of variation to be detected.

The relative positions of such terminal and of the main electrodes are of considerable importance because, other things being equal, the effects of the reactions at an auxiliary terminal of this type, seem to vary with the charge in the body of vapor, particularly in the region immediately adjacent such auxiliary terminal. The current density in the vapor varies with the total amount of current flow between the main electrodes and also with the relative position or location of the auxiliary terminal with reference to the main electrodes and the current path between said electrodes. Hence, for given conditions, the proper current density or charge of the vapor adjacent an auxiliary terminal, may be attained by adjusting or arranging the auxiliary terminal nearer to or farther from the main electrodes and the path between them, or, where the auxiliary terminal is already fixed in a suitable position, by increasing or decreasing the amount of current flowing between the main electrodes. The latter expedient will usually have the effect of changing the density and distribution of the current in the vapor and may be availed of to a certain extent.

The relation of the size of the auxiliary terminal to the current or charge carried by the vapor is important, and as a rough rule, the size should be decreased when the charge in the vapor is increased to obtain approximately the similar effects. And, further, if it is desired to vary the effect, increase of the area of the auxiliary terminal will have an effect somewhat analogous to increase of charge or current density in the body of vapor adjacent thereto.

By increasing the main current when receiving even faint signals, the volume of the signal may be amplified in many arrangements of this device, and this may be continued up to the point where they begin to be obscured by other variations developed.

Whatever type of device be employed for maintaining the supply of current in the vapor, such supply should be independent of the auxiliary electrode used for detecting purposes. An auxiliary electrode, because of its position or electrical connections, may have a tendency to be a positive or a negative electrode with reference to the vapor, or, being maintained at a neutral point, as by a source of counter-electromotive force, or by a condenser which may be used as such, it may under certain conditions tend to act as either, or alternately, as both. For some purposes it is preferable that it be arranged so as normally to have no current flowing either from or to it, except such currents as are the result of the action of the electrical variations to be detected, and in case it is desired that the device should have a rectifying action, the auxiliary electrode should tend to oppose a prohibitive barrier to the passage of current from the vapor into it. This action seems to be more complete when the current flow in the vapor adjacent to it is at or near a minimum and its surface area is not too great.

There may be a normal current flow either to or from an auxiliary terminal, and such flow may increase internally originated disturbances. There seems to be some difference in the phenomena caused by such tendency to normal current flow through the auxiliary electrode, according as the latter has the ability to act as a cathode to receive current from the vapor, or as an anode to deliver current to the vapor. When having the ability to act as a cathode to allow current flow into the auxiliary electrode, in many cases increase of such flow seems to directly decrease sensitiveness, and may produce disturbing indications, whereas when tending to act as an anode, too great increase of current flow apparently tends to obscure the observable indications and may mask the same under a disproportional increase of internally produced disturbances. Such disturbances may be made to assist in detecting certain kinds of variations. Hence, when the arrangement is such that the auxiliary electrode normally tends to act as an anode with current normally tending to flow from it, its area, shape, location, and material should be such as will not give rise to intense internal disturbing variations, unless it is desired to make use of them. Desirable effects are obtained where the auxiliary electrode tends to act as an anode having a slight normal current flow from it to the vapor, the quantity of such current being perhaps of the order of one-tenth to, say two milliamperes. In such case the indications from the received energy seem to be more intense up to a point where the increasing current causes disproportionately increasing disturbing conditions. When any condition of tendency to current flow to or from the auxiliary electrode suitable for receiving signals. has been attained, as for instance, where there is a normal flow of the order of 1/10 to 2 milliamperes, as indicated above, or more, from such terminal, electrical conditions thus established at the surface of the terminal may be considered for some purposes, as if still existing when a counter electromotive force or condenser is interposed in the circuit, although the normal current flow is thereby checked. For most wireless work, I prefer to use a small condenser or a counter connected potentiometer.

The reactions at the positive electrode are normally in an unstable state and give rise to rapid electric variations, which when heard in a telephone are rumbling, rattling, cracking sounds, and may, under certain conditions, produce clear musical notes. One means of rendering the reactions at the main positive electrode substantially stable, is to bring such main positive electrode in close proximity to the main negative electrode. In such case, the visible phenomena at the main positive electrode and the voltage drop, are modified and largely suppressed, and the attendant reactions may be so rendered practically noiseless to a telephone at an auxiliary electrode.

The size of the positive electrode is important with reference to the heating effect on it and also with respect to the bush reaction, and for most purposes it should be of sufficient area to pass the desired maximum current without becoming unduly overheated but it should not be too large on account of the bush reaction. It may be designed to be highly heated and its temperature may be made to affect the reactions at the negative electrode, as well as its own.

The vapor column, considered by itself, rarely presents any source of irregular or detrimental electrical variation. It is desirable to use means to maintain the current in the vapor normally constant and uniform in quantity and in distribution.

The internal variations may be modified by a magnetic field external to the device, the exact position and distance of the magnet suitable for given conditions being usually determined by a few trials. The magnetic field thus employed may be made to vary the internal resistance of reactions, and will often increase the sensitiveness of the device. The desired direction and distribution of the lines of force of the field may be established by proper design and location of a single magnet, or a plurality of magnets may be used to establish a resultant field. With a ring positive electrode, it is usually desirable to have the lines of force somewhere about 45 degrees from the normal direction of the negative electrode flame and with a disk positive electrode approximately parallel with such direction.

In all forms shown herein the conducting gas or vapor is inclosed in a suitable container preferably having three or more electrodes. The electrical reactions at the various electrodes and in the conducting medium may be thus caused and controlled as desired, to enable the development of suitable reactions within the medium itself for the desired purposes and to make possible the modification and control of the reactions. The temperature and density of the gas or vapor may be controlled in any desired way, as by determining the area and disposition of the outer radiating surfaces of the container or by the use of suitable expedients for increasing or decreasing the heat absorbing or heat imparting power of the surroundings, such as jacketing or immersing in heating or cooling baths parts or all of the device.

In all of the forms shown herein, the conducting medium is referred to as a gas or vapor medium contained between electrodes in an hermetically sealed vessel, but similar circuit connections may be made serviceable in connection with other mediums having similar reactions. A pure gas is preferable, however, since it tends to insure uniformity of the reactions. I prefer to use mercury or mercury vapor in an hermetically sealed vessel or container. The container and any solid electrodes therein, are preferably of such material as not to yield gases under the conditions of operation. The methods of cleansing and evacuating such devices by washing with mercury vapor and exhausting the same while subjected to the action of heat and of the electric current, are now well known in the art.

A starting band of the type well known in the art may be applied at a main negative electrode, or an auxiliary electrode, and may be used according to the practices well known in the art, or may be utilized as a means of operatively applying to the device, the variations to be translated or detected.

While my above described invention contemplates the utilization of reactions developed by current flow in a circuit which includes a gas or vapor as one of the conducting media, it will be understood that the special or auxiliary terminal and the circuit arrangements may be employed in connection with other conducting media carrying current supplied to the medium independently of the auxiliary terminal. In general the circuits whose reactions are to be utilized, should include differently conducting media affording variable electrical reactions of various classes, such as transition resistances, etc. I prefer a true conductor of the first class, such as ordinary conducting metals, and also a conductor of another class of conductivity as, for instance, one which is adapted to pass current after the manner of electrolytes or conducting fluids such as gases or vapors. A suitable source of electromotive force should be employed to maintain normal current flow in the circuit of the fluid medium, said current flow being preferably of relatively large quantity and low voltage. The indicator circuit should be lateral or branch or parallel circuit including a part only of the fluid medium of said first mentioned circuit.

The source of variations to be translated may be a circuit of either forced variations or oscillatory variations and may be an open circuit, connected to ground or a capacity, or not, as desired. A closed circuit of either forced variations or oscillatory variations may be applied to advantage or any other arrangements shown in each and all of the figures of the drawings by connecting the two sides of such closed circuit in the same way that the aerials S and ground G respectively are connected, or in any other desired way, all as will be well understood by those skilled in the art.

I have specifically shown and described herein only a few of the typical and desirable ways of arranging the aerial, indicating and direct current supply circuits. From these it will be evident to one skilled in the art that my vapor device is so sensitive that the variations to be detected or translated can hardly be applied to the same in such manner as not to produce some effect on the internal reactions and that those reactions will produce more or less pronounced sensible effects in the indicator whenever the latter is applied to the vapor device in such manner that impulses, direct currents, or displacement currents may flow therethrough in response to potential variations. The instrument should be designed or located so as not to be injured by the amperage of such current flow, and, in general, it is preferable to arrange the indicator and variation circuits in such manner that the variations to be detected may pass to the vapor device without being impeded or choked out by the indicator.

As hereinbefore indicated, the means for starting and maintaining current flow between the main electrodes of the vapor device may be any of those commonly known in the art as suitable or desirable for such purpose.

In the accompanying drawings I have shown various forms of vapor devices supplied with one or more auxiliary electrodes connected with an indicating instrument in various ways. The variety of arrangement disclosed is such as will enable those skilled in the art to understand the nature of my discovery and to arrange modifications adapting the same to further uses.

In the drawings:

Figure 1 shows a simple form of my device in vertical section and simple circuits therefor in diagram.

Fig. 2 is a similar view showing means for rendering the reactions at the main negative electrode more stable.

Fig. 3 is a similar view of a modification wherein the positive electrode is arranged close to the negative electrode in such manner as to render the reactions at the positive electrode more stable.

Fig. 4 is a similar view showing the auxiliary electrode at the top of the container, a typical indicator circuit.

Fig. 5 shows a vapor device having two solid and two liquid electrodes, which may be connected up in a multiplicity of ways herein referred to.

Fig. 6 illustrates a special form of the device wherein the positive electrode is adapted to heat a projection from the negative electrode.

Fig. 7 is a detail sectional view of a modified arrangement of main electrodes.

Fig. 8 illustrates a special form of vapor device having three concentric electrodes of different areas at the top of the device and certain connections to be referred to.

Fig. 9 illustrates a vapor device having a disk as the positive electrode and a plurality of permanent magnets arranged to modify the internal conditions and reactions.

In various of the figures of the drawings, electrodes of thin material having various outlines, are shown as viewed from a point above the planes of said electrodes, in order to show the structure more clearly. While any one or more of these electrodes may be arranged at various, similar or different angles, it is understood that these electrodes may be and preferably are arranged with their flat surfaces lying in planes at right angles to the axis of the vapor device. In either case the device is preferably normally operated in a vertical position, but may be and frequently is operated in a tilted position as desired, in order to vary internal conditions for particular purposes or conditions.

In the various figures of the drawings, the specific devices embodying my invention comprise main positive and negative electrodes, one or more auxiliary electrodes, and a suitable container. The main electrodes are supplied with current from a suitable source, preferably a direct current source, indicated in the drawings as a storage battery. This supply circuit is provided with suitable regulating devices, including preferably an adjustable ohmic resistance and an inductance which is also preferably adjustable. The ohmic resistance and the inductance may be more or less embodied in the same device, but are preferably separate. Suitable receiving and indicating circuits are operatively associated with the auxiliary electrode.

Like parts have been indicated by like reference characters on the various figures wherever this is possible without liability to cause confusion.

Referring more particularly to Fig. 1, the positive electrode 1 may be of any known or desired material suitable for the purpose, such as iron, platinum, carbon, or other conducting material. The particular cup shaped electrode shown in this and other figures, is preferably of the same material, size, and shape as the positive electrode now in general use in the Cooper-Hewitt lamps.

The negative electrode 2 consists of a body or conducting liquid preferably of mercury. The auxiliary electrode 3 is preferably a solid conductor of iron, platinum, carbon, or other suitable material, though it may consist of a body of conducting liquid, such as mercury, if desired. The container is preferably of glass, preferably hermetically sealed, and preferably having a high vacuum when cold. It may be of any suitable or desired size, and may be conveniently made about 2½ to 3 inches in diameter and about 5 or more inches in height. A device of such diameter and 7 inches in height will have a current carrying capacity through the main electrodes up to 4 or 5 amperes at pressures of, say, 7 to 25 volts, and will have ample heat radiating area.

The source of current supply is shown at 8, an adjustable resistance at 9, and an adjustable inductance at 10. The supply circuit is thus capable of regulation for purposes of controlling the amperage through the lamp and for steadying the same to normally uniform values.

The auxiliary terminal 3 is sensitive to the electrical variations to be detected and these are operatively applied to the device from any suitable source of variation, as, for instance, a receiving wire S of a space telegraph or telephone system brought in proximity to the device or connected directly to the auxiliary terminal as by connecting it to the band or collar arranged adjacent thereto. It will be understood that the variations to be utilized, may be from other sources and may be of comparatively low frequency and greater amperage. Where the variations to be utilized are feeble or rapid, it is desirable to connect the supply wire S in electrostatic relation to the auxiliary electrode 3 so that there shall be little capacity or impedance in the supply circuit leading to the auxiliary electrode. The detecting circuit is preferably arranged to have a suitable value of impedance, that furnished by a telephone receiver serves well, and a telephone having a resistance of 500 to 2000 ohms is frequently found suitable for the purpose of wireless telegraphy. In case the impedance is the primary of a transformer, the inductance and resistance may be selected to suit, as desired. The receiver or indicator circuit R connected at one end to an auxiliary electrode, may be connected at the other end to a capacity, or to the main positive or negative electrode or in a multiplicity of ways hereafter more fully referred to. In Fig. 1 it is shown connected to a capacity area C, which for space signaling purposes need not be very large. A ground connection G is sometimes desirable, but not always necessary, and may be made by connection from a main electrode as in Fig. 3, if desired. Where the main direct current supply is from a commercial lighting circuit, such circuit may be utilized as a capacity or ground as in Fig. 8.

The vapor device shown in Fig. 1 is useful for many purposes, but the internally originated disturbing variations at the electrodes, due to the passage of the current, are manifest at the auxiliary electrode and tend to obscure its action when minute variations are to be detected.

Fig. 2 shows a device similar to that in Fig. 1, but provided with one of the various possible means for lessening the internally originated disturbing variations, by rendering reactions at main negative electrode more stable. This result is accomplished by arranging a projection 12 extending above the surface of the mercury 2 and wetted thereby, after the manner hereinbefore referred to. A platinum wire projecting a short distance and having a diameter of .045 inch, serves well for this purpose, for currents of from 1¼ to 2½ amperes or even more.

Fig. 3 represents a similar vapor device having the reactions at the negative electrode rendered stable in the manner just described, and embodying also a means for rendering stable the reactions at the positive electrode. In this form the positive electrode 11 is brought into close proximity to the negative electrode and arranged in the form of a ring symmetrically surrounding the projection 12 of the negative electrode, above and preferably parallel with the surface of the mercury 2 and preferably slightly above said projection. If the ring is used in the form of a flat disk of iron 1⅛ inches in external diameter and ¼ inch or less in internal diameter, it will pass 2½ to 3 amperes of current without becoming unduly heated.

The internal diameter of the ring should not be too great with respect to its distance from the projection 12, for otherwise there may be a tendency to unstable reactions giving rise to disturbing fluctuations. Ring electrodes of the above specified sizes, however, carrying currents as described, are very suitable for the purpose, but this electrode may be varied in size and shape and may be a disk or other shape.

A convenient method of determining or adjusting the distance of such a positive electrode from the surface of the mercury consists in providing the container with a pocket 15 adapted to contain an extra supply of mercury 16. In such a device the desired amount of mercury may be poured off from the negative electrode into the pocket, or vice versa.

In this form of device the starting may be conveniently effected by shaking the device so that the mercury of the negative electrode momentarily comes in contact with the positive electrode, thereby making and breaking a bridge.

With the above described arrangements, the visible phenomena at the main positive electrode and its resistances are modified and largely suppressed and the attendant disturbing reactions are made practically unnoticeable so far as concerns their effects at the auxiliary electrode and in the indicator connected thereto. The device may be operated at a lower potential than that of Fig. 1 and it has a much greater current capacity, the latter being limited, in practice, mainly by the size and fusibility of the positive electrode.

The heating effect at the positive electrode is less as the surface of the positive electrode is increased, and this arrangement may be used to carry current up to 5 amperes at a voltage of 7 to 10 or 12 volts, depending upon the characteristics of the particular device. The operation of this form of device under varying conditions, seems to vary with the position of the positive electrode with respect to the negative electrode, particularly for positions varying from barely out of contact with the surface of the mercury to, say, ⅝ inch or more from the surface of the mercury.

In the arrangement shown in Fig. 3, the auxiliary electrode 13 is comparatively small in area and is located in the side of the container. For most purposes, a larger auxiliary electrode 13, located at the top of the container as shown in Fig. 4 is preferable.

This auxiliary electrode may be a cup shaped electrode of the same material, size, and shape as the main positive electrode of Fig. 1, which, as I have stated, is like that now in general use in the Cooper-Hewitt lamps. For some purposes a flat disk such as shown at 13$^c$, Fig. 8, is preferable. The current density in the vapor adjacent such auxiliary electrode may be adjusted by changing the current flow between the main electrodes.

It will be understood that in all forms, any solid electrode having sufficient area to carry the current, may be used as a main positive electrode, and any one or all of the others used as auxiliary electrodes. For instance, it will be understood with respect to the form shown in Fig. 5, that either of the lower electrodes 2, 2$^a$, may be used as a main negative electrode, either of the solid electrodes, 1, 1$^a$, or the remaining liquid electrode being used as the main positive electrode. In such case, one or both of the other two electrodes—*i. e.*, two solid or two liquid electrodes or one solid electrode and one liquid electrode, may be used as auxiliary electrode or electrodes in connection with any of the indicator circuits hereinbefore or hereinafter indicated.

As will be evident from the detailed statement of the nature and objects of my invention, the vapor device is extraordinarily sensitive in a multiplicity of ways to the electrical variations of widely varying characteristics of frequency, quantity, etc., and the circuits suitable for utilizing or indicating these variations are very numerous.

As has been explained in connection with the simple circuit in Figs. 1 to 4, the source of variations may be connected or brought into operative relation to the device in such manner that said variations reach the auxiliary electrode, preferably without being subject to any considerable impedance or reactance. The indicator circuit is preferably directly connected to the auxiliary electrode and to the indicating instrument. Such circuit may be connected at the other end to a capacity or a ground, or to the main negative electrode, or the main positive electrode, or to another auxiliary electrode, or to several auxiliary electrodes in parallel. Furthermore, the auxiliary electrode may consist of several separate electrodes connected in parallel and used as if they were a single auxiliary electrode.

In Fig. 4 the indicating circuit is from the auxiliary cup shaped electrode 13 at the top of the container, through the indicating device to the negative electrode 2, as shown. The impedance, particularly inductance, for the circuit of the receiving device exercises an important function, and the best value thereof should be ascertained by trial when the device is to be used for particular purposes. The indicator R may be an electromagnetic telephone receiver having sufficient impedance for the particular purpose in view, for instance, 100 to 2000 ohms resistance. Where the indicator itself has small impedance, either because of the character of the winding used, or because of the nature of the device, as where the indicator is a condenser telephone receiver, it will be understood that an adjustable impedance may be used in any of the circuits shown herein, but it is usually more desirable that it be in the receiving instrument.

The electromotive force across the indicator circuit from the auxiliary terminal to the main negative electrode is more or less counter-balanced, or if desired, over-balanced by the potentiometer 18 shown. The latter may be adjusted to cause slight current flow to or from the auxiliary electrode, and this device may be used in connection with the other devices and circuits shown herein.

In Fig. 6 the vapor device is shown with connections to a receiving circuit which may be useful with other forms of the device. The receiving conductor S is shown tuned as at 47 to a quarter wave length and the lateral conductor 45 leading to the electrode 13$^c$ of the vapor device is also tuned as at 46 to the same frequency. The ground connection G may be adjustable as at 48 and when the latter is used the circuit G, 48, 47, S will be the electrical equivalent of the circuit G, 48, 46, 45, 13$^c$, so that there will be a crest of potential at 13$^c$.

Referring more particularly to the arrangement of Fig. 6, if the auxiliary electrode 13$^c$ be a circular plate 1¼ inches in diameter and its distance from the mercury negative electrode 2 be five inches and the main positive electrode be a ring of iron 1⅛ inches outside diameter having a hole in the center ¼ to 1/16 inch in diameter and if it be situated ¾ of an inch from the surface of the mercury electrode, the container vessel being substantially from 2½ to 3 inches in diameter, and properly exhausted, said vapor device will respond to extremely faint variations. Its sensitiveness may be increased by approaching an ordinary permanent magnet M somewhat in the manner shown in Fig. 9.

Fig. 7 shows a form of device wherein there may be special heating action of the positive electrode 11$^b$ on the negative electrode when the positive electrode is so designed with respect to the current flowing therethrough as to be highly heated. To this end the positive electrode is made small, so as to become heated by the passage of current from it, and is concentrically arranged around a projection 12$^a$ from the negative electrode, which it tends to heat, this projection tending to render stable the negative electrode reactions at its base. Such a positive electrode being constructed of platinum wire .057 inches in diameter and wound in a helix, having an inside diameter of ¼ inch and being of two turns, will become heated with 1 ampere passing, and will work with 1½ amperes, the bottom of the helix being substantially ⅛ inch from the level of the mercury.

The circular auxiliary electrode 13$^c$ is shown in Fig. 8 as flattened and arranged in a transverse plane with the flat surface approximately equidistant from the path between the main electrodes, so that almost all of the surface of the electrode exposed to the vapor lies in an approximately equipotential region of suitable current density. This arrangement has certain advantages where it is desired to use a fine adjustment of counter electromotive force of a potentiometer to secure the most sensitive condition for feeble signals. One reason for this is that if the auxiliary electrode is formed or arranged so that the exposed surface thereof extends through regions at materially different distances from the path between the main electrodes, different parts of such exposed surface may lie in regions of materially different current density. While this latter condition may not be objectionable for many purposes, it is sometimes found to be unsatisfactory for the finest work in connection with the faintest signals.

One probable reason for this is that the condition of most extreme sensitiveness of the auxiliary electrode seems to depend upon getting an extremely fine balance of the counter electromotive force of the potentiometer against the electrical pressure at the surface of the auxiliary electrode. The latter pressure has for one important determining factor the current density in the portion of the vapor in contact with the electrode, and it seems to be a fact that if the auxiliary electrode is so formed or arranged that there are materially different current densities in the vapor adjacent different portions of its surface, the counter electromotive force of the potentiometer when set to a proper value for the current density adjacent one portion of the exposed surface, will be either too great or too small for other portions where the adjacent current density is of different value. On the other hand, if all portions of the exposed electrode surface are acted upon by vapor of substantially the same current density, the counter electromotive force may be very accurately adjusted to that current density, and such adjustment being perfect for one portion of the electrode is perfect for any other portion of the electrode.

Another reason may be that a uniform density of current flow into and out of a considerable area of the electrode may be desirable. This result should be accomplished by the above arrangement of the auxiliary electrode, because by it the lengths and resistances of the vapor path from different portions of the surface of the electrode, will be substantially equal.

Fig 8 illustrates an arrangement of three concentric auxiliary electrodes 13$^a$, 13$^b$, as well as 13$^c$ of different areas, preferably in the same plane, whereby the working surface area of auxiliary electrode may be rapidly and conveniently changed where varying indications are to be received. In connection with this device is shown a condenser 82 interposed in the aerial and having a shunt circuit to ground from the part of the aerial above the condenser through a small vapor gap or inductance for tapping off atmospheric charges from the aerial. I have employed for this purpose a vacuum tube constructed and arranged very much as shown in the drawings. The tube is about 3 inches long provided with disk electrodes 84, 85 and has a calcium compound therein intended to fluoresce upon passage of suitable current between the electrodes, the specific material in this particular case being a compound of calcium, probably calcined shells. This device was found to discharge at a pressure as low as 150 volts, and its action appears in no way to interfere with the impulses to be received by the receiving apparatus. The current supply between main electrodes is indicated as being from a commercial, direct current generator 86, with a shunt storage battery 8 adapted to be charged thereby.

In Fig. 9 I have shown a modified vapor device of the general type of construction hereinafter described, having an indicating circuit R, 19, between the main positive electrode 11$^a$ and the auxiliary electrode 13, and a circuit 8, 9 and 10 acting to supply current through the main positive electrode 11$^a$ into the main negative electrode 12, 2. The variations to be detected or translated are received through the wire 64, which may be connected with any desired wire or wireless circuit. The main positive electrode 11$^a$ of this vapor device instead of being a ring or perforated plate, is a disk or imperforate plate, preferably thin and about 1 to 1$\frac{3}{16}$ inches in diameter. Its size and location with respect to the surface of the mercury and projection 12 are much the same as in other cases hereinbefore specified. When such disk is used instead of the ring or perforated plate, there are various modifications in the phenomena manifested, and the device is particularly sensitive to the influence of a magnetic field.

The magnets seem to have the most marked effect in increasing sensitiveness, when they are arranged close to the container and so related thereto as to cause the magnetic lines from the poles thereof to lie in a plane of the axis of the device. In the arrangement shown in Fig. 9 the permanent magnets M', M² are symmetrically arranged in the same axial plane of the container with the south poles of each close to the negative electrode and the north poles close to the walls of the container about midway thereof and between the main positive electric 11ª and the auxiliary electrode 13. Such an arrangement seems to have very marked effect in increasing the sensitiveness of the device and a slight movement of either of the poles of either of the magnets to or from the container or out of diametrical symmetrical relation causes far greater changes in the internal effects manifested in the receiver R, than do corresponding changes in the position of the magnet M in the case of the perforated plate or ring positive electrode of Fig. 8.

My experiments show that other things being equal, the perforated plate or ring positive electrode of Fig. 4 seems to give smoother effects more directly proportional to the received variations, whereas the disk arrangement as shown in Fig. 9 seems to give more distorted or disproportionally amplified indications. This quality of the disk or imperforate plate seems to render it particularly useful for receiving impulse signals, whereas the perforated plate seems to preserve the value of the amplified variations more accurately and to be better adapted to translate telephone variations.

In many cases the operation of the device is improved by maintaining a constant static charge of a desired pressure upon the aerial and upon the auxiliary electrode. This may be accomplished by using a condenser in the ground connection and employing a shunt vacuum device such as shown at 83, Fig. 8. If then the aerial be charged from the atmosphere or from any suitable source of potential, the gap at 84, 85 will act as a pressure escape valve to maintain the pressure within desired limits. The potential at which this valve will pass current may be modified by any suitable means as, for instance, by an external source of radioactivity, or ultraviolet or cathode rays.

The device described herein may be designed so as to be used for the purpose of receiving varying impulses of any frequency or strength and making them serviceable on direct current devices. It is also adapted for telephonic purposes, particularly for wireless telephony.

For alternating currents the device may be constructed or arranged so as to be asymmetric, and may therefore be connected up either singly or in a pair in any of the well known ways, to take advantage of one or both halves of the alternating current to produce indications or effects in a telephone or other translating device such as a direct current indicator or instrument. With certain currents it may be made use of to take advantage of certain portions of a wave.

The asymmetric resistance characteristics of the vapor device when constructed and operated as herein explained, may be made to persist for the highest frequencies as well as for the lowest voltages, and these characteristics may be relied upon for the rectification or asymmetric translation of variations of an extremely small fraction of a volt and of the highest frequency, thereby rendering possible the use of a direct current indicating instrument.

I have found it desirable in order to fully utilize the asymmetric resistance characteristics of the device to so arrange the auxiliary electrode that it will act as an approximately no resistance positive electrode and as a substantially prohibitive negative electrode with respect to oscillations of the strength which it is desired to translate or detect by such device. When properly designed and arranged, the half waves or impulses coming through such electrode pass off freely into the gas or vapor, but the half waves or impulses tending to run in the opposite direction are substantially blocked, thus giving the rectifying effect necessary for operating the direct current or other instrument.

This result may be achieved in connection with any of the typical circuits and devices shown herein. Referring for convenience to Fig. 4 the electrode 13 should be located at such distance from the main electrodes 11, 12 that the current flow therefrom and the current density of the vapor adjacent thereto is near the point where normal internal variations begin to cause disturbing indications in the instrument R. In a particular case this distance might be somewhere between 4 and 7 inches or, say, about 5 inches. The distance should be and in the case mentioned usually will be, such that the current density in the vapor adjacent the auxiliary electrode will not be sufficient to neutralize the opposition or reluctance of such electrode to act as a negative electrode with respect to impulses of the strength which it is desired to rectify. Under such conditions the flow of current from the auxiliary electrode into the vapor will be measured by a normal voltage drop at the auxiliary electrode which may be some 1, 2, 3, or more volts, according to the conditions. The application of electromagnets after the manner described in connection with Fig. 9 may serve to reduce this voltage drop to a fraction of a volt, say, for instance, to 7/10 volt or less. If now the potentiometer 18 be applied as a source of counter electromotive force, this drop may be counterbalanced by adjusting the potentiometer to a pressure of, say, 7/10 volt in the opposite direction. It is a peculiarity of such device, however, that in order to suppress the effects of internally originated disturbances in the telephone R, the counter electromotive force should be slightly greater than the original drop, or say somewhere about 75/100 volt, where the drop was found to be 7/10 volt. By still further experimental refinement of adjustment of this counter electromotive force, the voltage drop at the auxiliary electrode may be reduced practically to a zero, so that half waves or impulses of the smallest fraction of a volt, say, for instance, 1/10 volt to 1/100 volt, or less, will pass freely and practically unimpeded into the vapor, whereas the half waves or impulses tending to run in the opposite direction will be blocked and prevented from passing from the gas into the electrode 13$^c$, so that the effects of the variations are observable in a direct current instrument. The adjustable potentiometer thus arranged, is an accurate means for attaining at the electrode 13$^c$, the conditions which will best serve the purpose of detecting alternating currents by a direct current instrument and yet not give rise to undue internally originated disturbances which might tend to mask the effects in the indicator R.

While I have last above described an arrangement of my device which is particularly efficient for rectifying, it will be understood that the device is so remarkably sensitive in such a variety of ways that it will act as a very good detector of feeble variations such as are characteristic of the receiving wires of ordinary commercial wireless telegraph systems, even when the adjustments are such that the asymmetric action is at a minimum.

With reference to magnets, it will be understood that the position and number of the magnetic lines and their action with respect to the negative electrode flame and other phenomena, may be varied by adjustment of any desired number of permanent magnets in a variety of ways. If desired the adjustment of strength of the magnets may be conveniently altered by using electromagnets in place of permanent magnets. By adjusting either independently or together, the current flow in the solenoids of one or more electromagnets used to produce a single resultant field, the direction and distribution of the lines of force in said resultant field may be changed as desired. Permanent magnets or other means for producing a magnetic field may be used to modify current flow at a positive or at an auxiliary electrode by being located at such electrode or electrodes.

This application is a division of my application No. 365,597, Mar. 30/07, patented June 29/15, No. 1,144,596.

I claim:

1. An apparatus for translating electrical variations comprising indicator, variation and main current supply connections, in combination with a gas or vapor tube provided with electrodes for maintaining normal current flow therein, one of said electrodes being liquid, a conducting solid projecting above the surface of the said liquid and an auxiliary pocket adapted to contain a supply of said liquid.

2. An apparatus for detecting electrical variations, comprising variation and main circuit connections, in combination with a gas or vapor device having two main electrodes, the main negative electrode being in the broken down state of resistance and passing current, in combination with a magnetic field arranged with the magnetic lines in the region of said negative electrode, lying approximately parallel with the general direction of the negative electrode flame, substantially as described.

3. An apparatus for detecting electrical variations, comprising variation and main circuit connections and a gas or vapor device having two adjacent main electrodes, the main negative electrode being in the broken down state of resistance and passing current, in combination with a magnetic field arranged with magnetic lines lying in the path between said main electrodes, substantially parallel with the direction thereof, substantially as described.

4. An apparatus for detecting feeble electrical variations, comprising an hermetically sealed container having a high vacuum when cold and provided with main electrodes and a source of current for maintaining normal current flow therethrough, an auxiliary terminal and a circuit therefrom through an indicator, one of said main electrodes containing mercury and being provided with a projection wetted thereby, in combination with a magnetic field, arranged with its magnetic lines in the region of said negative electrode, lying approximately parallel with the general direction of the negative electrode flame, substantially as described.

5. An apparatus for detecting feeble electrical variations, comprising an hermetically sealed container having a high vacuum when cold, and provided with main electrodes and a source of current for maintaining normal current flow therethrough, an auxiliary terminal and a circuit therefrom through an indicator, in combination with a magnetic field arranged with its magnetic lines in the region of said negative electrode, lying approximately parallel with the general direction of the negative electrode flame, substantially as described.

6. An apparatus for detecting feeble electrical variations, comprising an hermetically sealed container having a high vacuum when cold and provided with main electrodes and a source of current for maintaining normal current flow therethrough, an auxiliary terminal and a circuit therefrom through an indicator, one of said main electrodes containing mercury and being provided with means for anchoring the negative electrode flame and the other main electrode being a plate arranged adjacent thereto, in combination with a magnetic field arranged with magnetic lines lying in the path between said main electrodes and substantially parallel with the direction thereof, substantially as described.

7. An apparatus for detecting feeble electrical variations, comprising an hermetically sealed container having a high vacuum when cold and provided with main electrodes and a source of current for maintaining normal current flow therethrough, an auxiliary terminal and a circuit therefrom through an indicator, one of said main electrodes containing mercury and being provided with means for anchoring the negative electrode flame and the other main electrode being a plate arranged adjacent thereto, in combination with a magnetic field arranged with magnetic lines lying in the path between said main electrodes and substantially parallel with the direction thereof, substantially as described.

8. An apparatus for detecting feeble electrical variations comprising an hermetically sealed container having a high vacuum when cold and provided with main electrodes and a source of current for maintaining normal current flow therethrough, an auxiliary terminal and a circuit therefrom through an indicator, said main negative electrode being provided with means for anchoring the negative electrode flame, in combination with a magnetic field arranged with the magnetic lines in the region of said negative electrode, lying approximately parallel with the general direction of the negative electrode flame, substantially as described.

9. An apparatus for translating electrical variations comprising indicator, variation and main current supply connections, in combination with a gas or vapor tube, provided with electrodes for maintaining normal current flow therein, one of said electrodes being liquid, and an auxiliary pocket adapted to contain a supply of said liquid.

10. The method of producing an acoustically observable indication by means of electrical variations applied to a vacuum tube, which method consists in establishing a normal current flow between adjacent terminals within said device shunting through an acoustic indicator a portion of the current flowing within the device, adjusting the voltage and amperage of said main current flow and the position and strength of an external magnetic field so as to produce a critical condition of whistling or cyclic variation in said main current flow and applying electrical variations to the device to thereby change said critical condition and thereby produce an audible observable response in said acoustic indicator.

11. The method of producing an audible indication by electrical variations applied to a vacuum tube, which method consists in establishing a main current flow between adjacent main terminals within said device, shunting current through an acoustic indicator from the body of conducting vapor established within the device, adjusting the voltage and amperage of said main current flow and the position and strength of an external magnetic field so as to produce a normally established sound or note within said indicator, and applying electrical variations to the device to thereby vary or interrupt the normal sound producing conditions and the sounds thereby produced in the indicator.

12. The method of producing an audible indication by electrical variations applied to a vacuum tube, which method consists in establishing a main current flow between adjacent main terminals within said device, shunting current through an acoustic indicator from the body of conducting vapor established within the device, adjusting the voltage and amperage of said main current flow so as to produce a normally established sound or note within said indicator, and applying electrical variations to the device to thereby vary or interrupt the normal sound producing conditions and the sounds thereby produced in the indicator.

13. The method of translating electrical variations to produce sensible indications or effects, which method consists in establishing electric current flow through a conducting vapor within a vacuum device, shunting current to a translating device from the current carrying vapor, adjusting the voltage and amperage of said main current flow so as to automatically produce a succession of electrical variations in the circuit of said translating device, and applying to said vacuum device the electrical variations to be translated, to thereby vary or interrupt the internal conditions upon which the automatic variations depend, thereby producing sensible effects in said translating device.

14. The method of translating electrical variations to produce sensible indications or effects, which method consists in establishing electric current flow through a conducting vapor within a vacuum device, shunting current to a translating device from the current carrying vapor, adjusting the voltage and amperage of said main current flow and the position and strength of a magnetic field with respect to the vacuum device so as to automatically produce a succession of electrical variations in the circuit of said translating device, and applying to said vacuum device, the electrical variations to be translated, to thereby vary or interrupt the internal conditions upon which the automatic variations depend, thereby producing sensible effects in said translating device.

15. The method of translating electrical variations to produce sensible indications or effects, which method consists in establishing electric current flow through a monatomic gas or vapor within a vacuum device, shunting current to a translating device from the current carrying vapor, adjusting the voltage and amperage of said main current flow so as to automatically produce a succession of electrical variations in the circuit of said translating device, and applying to said vacuum device the electrical variations to be translated, to thereby vary or interrupt the internal conditions upon which the automatic variations depend, thereby producing sensible effects in said translating device.

16. The method of translating electrical variations applied to a vacuum device, which method consists in establishing conditions within the device and applying a suitable source whereby current passes through the device under moderate electromotive force, predetermining or adjusting an electrode with respect to its size and the current density to which it is exposed so as to create internally originated electrical variations and applying said internally originated variations to a circuit including a portion of the space within the vacuum device, and including an external translating device and finally applying to the device electrical variations to be translated and thereby producing in the translating device by the resulting variations, effects differing from the internally originated variations.

17. The method of translating electrical variations applied to a vacuum device, which method consists in establishing conditions within the device and applying a suitable source whereby current passes through the device under moderate electromotive force, predetermining or adjusting an electrode with respect to its size and the current density to which it is exposed and adjusting a magnetic field with respect to said vacuum device so as to create internally originated electrical variations and applying said internally originated variations to a circuit including a portion of the space within the vacuum device, and including an external translating device and finally applying to the device electrical variations to be translated and thereby producing in the translating device by the resultant variations, effects differing from the internally originated variations.

Signed at New York city, in the county of New York and State of New York, this 14th day of May, 1915.

PETER COOPER HEWITT.

Witnesses:
    WALTER E. F. BRADLEY,
    RAYNER M. BEDELL.